(12) United States Patent
Mayer

(10) Patent No.: US 8,484,517 B2
(45) Date of Patent: Jul. 9, 2013

(54) HIGH COMPRESSION PROGRAM FLOW TRACE

(75) Inventor: Albrecht Mayer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 872 days.

(21) Appl. No.: 12/630,482

(22) Filed: Dec. 3, 2009

(65) Prior Publication Data

US 2011/0138231 A1      Jun. 9, 2011

(51) Int. Cl.
*G06F 11/00*         (2006.01)
(52) U.S. Cl.
USPC ............... 714/45; 714/37; 714/25; 714/47.3
(58) Field of Classification Search
USPC ........................................... 714/45, 47.1, 48
See application file for complete search history.

(56) References Cited

U.S. PATENT DOCUMENTS

| | | | | | |
|---|---|---|---|---|---|
| 5,539,907 | A | * | 7/1996 | Srivastava et al. | 717/130 |
| 7,200,846 | B2 | * | 4/2007 | Dice et al. | 718/102 |
| 2002/0010879 | A1 | * | 1/2002 | Chen | 714/38 |
| 2003/0005271 | A1 | * | 1/2003 | Hsu et al. | 712/237 |
| 2005/0050403 | A1 | * | 3/2005 | Glaser et al. | 714/48 |
| 2008/0256396 | A1 | * | 10/2008 | Giannini et al. | 714/45 |

* cited by examiner

*Primary Examiner* — Sarai Butler
(74) *Attorney, Agent, or Firm* — Schiff Hardin LLP

(57) ABSTRACT

A system and method provides for generating high compression program flow trace data by generating first program flow trace data whenever a conditional branch instruction of a program is executed by a CPU, generating second program flow trace data whenever an indirect branch instruction of a subset of indirect branch instructions is executed by the CPU, and generating third program flow trace data whenever a stack for storing instruction addresses of the program is manipulated, the manipulation occurring after a CALL instruction to a function or subroutine of the program is executed by the CPU and before a RET instruction is executed by the CPU. The subset of indirect branch instructions excludes RET indirect branch instructions of any function or subroutine for which the stack is not manipulated after a CALL instruction to the functions or subroutines is executed by the CPU and before the RET instruction is executed by the CPU.

22 Claims, 3 Drawing Sheets

HIGH COMPRESSION PROGRAM FLOW TRACE

FIELD OF THE INVENTION

Certain embodiments of the invention relate to creating trace solutions for debugging and performance analysis of computer processing systems. More specifically, certain embodiments of the invention relate to creating high compression program flow traces in which retrieval/output of trace data does not require dedicated trace pins.

BACKGROUND OF THE INVENTION

The application of conventional program flow trace schemes to a typical task-oriented software program application, such as, for example, program code instructions for controlling mechanical/electronic tasks in which approximately 5% of the executed instructions are unconditional direct branches, 10% are conditional branches and 4% are indirect branches, generates trace data rates of about 0.8-1.0 bits per executed instruction. Given that the number of instructions per cycle may be approximately 0.52 for such an embedded application, a 200 MHz processor core will generate a conventional trace data rate of about 80-100 Mbits/s.

However, a conventional 2-pin tool interface of a computer processing system typically has a bandwidth of 40 Mbits/s, thereby requiring an additional 2-3 dedicated trace pins to accommodate the conventional trace data rate. Furthermore, as the computing power and clock rate of modern processors increase more and more, the trace data rate increases correspondingly so, thereby requiring more dedicated trace pins to retrieve/output the large volumes of trace data.

It would be desirable to implement a system and method for retrieving trace data that allow for reconstruction, debugging and performance analysis of computer program flow without the additional cost and constraints imposed upon the system by dedicated trace pins.

BRIEF SUMMARY OF THE INVENTION

According to an embodiment of the invention, a method for generating high compression program flow trace data comprises generating first program flow trace data whenever a conditional branch instruction of a program is executed by a CPU, generating second program flow trace data whenever an indirect branch instruction of a subset of indirect branch instructions is executed by the CPU, and generating third program flow trace data whenever a stack for storing return instruction addresses of the program is manipulated, the manipulation occurring after a CALL instruction to a function or subroutine of the program is executed by the CPU and before a RET instruction is executed by the CPU. The subset of indirect branch instructions excludes RET indirect branch instructions of any function or subroutine for which the stack is not manipulated after a CALL instruction to the functions or subroutines is executed by the CPU and before the RET instruction is executed by the CPU.

In an embodiment of the invention, the method comprises packing the first, second and third program flow trace data together to generate packed program flow trace data, where each packed program flow trace data has a predefined bit length, and storing the packed program flow trace data in a first-in-first-out buffer.

According to an embodiment of the invention, a system configured to generate high compression program flow trace data comprises a CPU having a stack adapted to store return instruction addresses of a program. Furthermore, the CPU is adapted to generate first program flow trace data whenever a conditional branch instruction of the program is executed by the CPU, generate second program flow trace data whenever an indirect branch instruction of a subset of indirect branch instructions is executed by the CPU, and generate a third program flow trace data whenever the stack is manipulated, the manipulation occurring after a CALL instruction to a function or a subroutine of the program is executed by the CPU and before a RET instruction is executed by the CPU. The subset of indirect branch instructions excludes RET indirect branch instructions of any function or a subroutine for which the stack is not manipulated after a CALL instruction to the functions or subroutines is executed by the CPU and before the RET instruction is executed by the CPU.

The system comprises a system bus coupled to the CPU and a trace unit coupled to the system bus. The trace unit is adapted to process the first, second and third program flow trace data to generate high compression program flow trace data.

In an embodiment of the invention, the trace unit comprises a message packer adapted to pack the first, second and third program flow trace data together to generate packed program flow trace data, where each packed program flow trace data has a predefined bit length, and a first-in-first-out buffer adapted to store the packed program flow trace data.

These and other advantages, aspects and novel features of the present invention, as well as details of an illustrated embodiment thereof, will be more fully understood from the following description and drawings.

DETAILED DESCRIPTION OF THE INVENTION

Trace flows are useful for software debugging of applications to determine which kind of events had taken place before a particular software problem arose. Trace flows are also useful to analyze performance of task-oriented embedded and non-embedded applications executed on various software/hardware platforms. For example, task-oriented software programs may be executed by processors applicable to controlling aspects of industrial and consumer devices, or may include business and scientific application software. For the purposes of this description, applications, software programs, application software, program applications, and programs comprise sets of instructions executable by microprocessors, and such terms may be interchangeably used.

Figure 1:
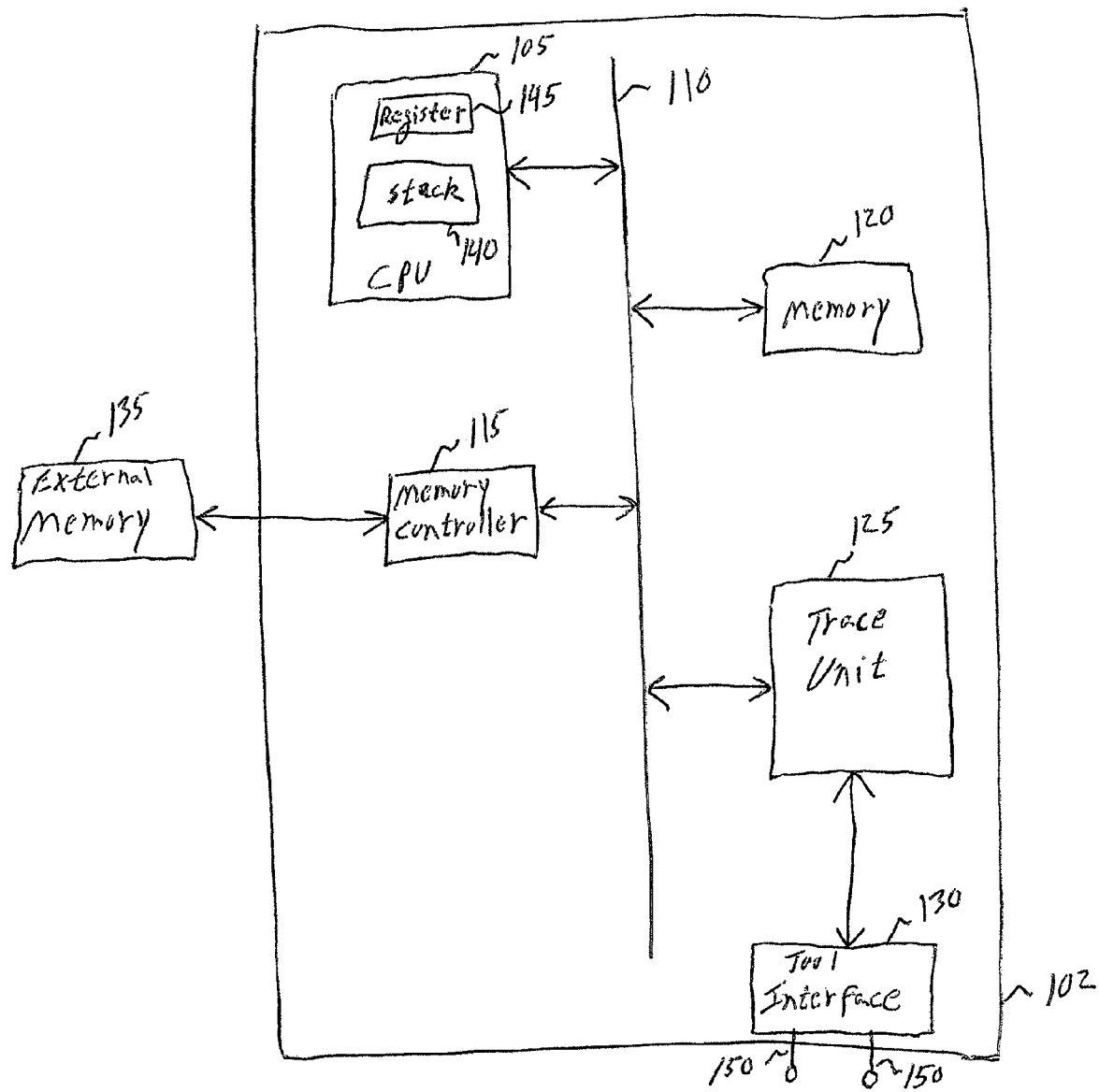
FIG. 1 is a schematic diagram of a computer processing system, according to an embodiment of the invention.

FIG. 1 is a schematic diagram of a computer processing system 100, according to an embodiment of the invention. The computer processing system may be implemented on a microchip 102, and includes a central processing unit (CPU) 105, a system bus 110, a memory controller 115, an internal memory 120, a trace unit 125 and a tool interface 130.

The CPU 105 is coupled to the internal memory 120 via the system bus 110 and to an external memory 135 via the system bus 110 and the memory controller 115. As illustrated, the internal memory 120 and CPU 105 may be provided on a single microchip 102, but the scope of the present invention covers a plurality of microchips which may provide for various configurations of the components of processing system 100.

The memory 120 may comprise any combination of volatile random access memory (RAM) and non-volatile read-only memory (ROM) for storing an operating system (OS) and embedded and/or non-embedded program applications.

The CPU 105 includes one or more stacks 140 into which current program instruction addresses may be stored. The one or more stacks include return address stacks (also referred to as CALL stacks) for storing return instruction addresses associated with CALL instructions to a function or subroutine of the current program being executed by the CPU. The current program instructions corresponding to the addresses may be loaded from memory 120 for execution by the CPU 105. Furthermore, the CPU 105 may include one or more instruction pointer registers 145 that contain memory addresses of instructions currently being executed by the CPU 105, or in alternative embodiments, by other microprocessors (not shown) of the computer processing system 100. In other embodiments, some or all of the registers 145 or stacks 140 may be part of the memory 120.

The external memory 135 may comprise any combination of RAM and ROM configured to store data to be used and possibly modified by the CPU 105 in execution of the program applications. The internal memory 120 may also be adapted to store data, as well as program instructions. The external memory 135 may be provided on a microchip different than the microchip 102.

The trace unit 125 enables reconstruction of a monitored program flow via flow trace data decompression algorithms implemented by an external tool (not shown) coupled to pins 150 of the tool interface 130. For these purposes, the trace unit 125 processes trace data which is information about a running application without halting its execution and may record the trace data sequentially, i.e. information about executed instructions may be stored in the sequence of their execution. The trace unit 125 may record values of the instruction pointer register(s) 145 (also known as program counter(s)) and the stack(s) 140 of the CPU 105 and/or may record data accessed and processed by the CPU 105 and/or the data flow on the system bus 110 or other busses of the CPU 105 or system 100.

As illustrated, the program counter 145 is a register in the CPU 105 which indicates where the CPU 105 is in its instruction sequence in executing instructions stored in the stack 140. Depending on the type of microprocessor or CPU 105, the instruction program register 145 comprises either the address of the instruction being executed or the address of the next instruction to be executed.

In general, the instruction pointer register 145 is automatically incremented for each instruction cycle so that instructions are normally retrieved sequentially from the internal memory 120. However, certain instructions, such as certain categories of branch instructions and "return" instructions from within functions and subroutines called from the main program, interrupt the sequence by placing a non-sequential value in the instruction pointer register 145.

When tracing the instruction pointer register 145, the trace unit 125 continually receives messages comprising program flow information (i.e, trace data). Provided that the program flow is linear, a respective message may comprise the number of executed linear program steps. If there is a branch in the program flow, the message will indicate a branch and, if required, the destination address of the branch.

Conventional program flow trace schemes generate trace data from conditional branches and indirect branches in the program flow. Sequential program flow and unconditional direct branches do not generate trace data. Typically, trace data triggered by an indirect branch in the program flow is not the address stored at the location to which the indirect branch points, but is instead the stored address XORed with an address corresponding to a previous instruction (i.e, the instruction immediately previous to the indirect branch instruction).

A direct branch specifies the address of the next instruction to execute. In contrast, an indirect branch specifies where the address of the next instruction is located. For example, a branching instruction could specify "jump indirect to the r1 register," which would mean that the next instruction to be executed would be at the address whose value is in register r1. The address to be jumped to is not known until the indirect branching instruction is executed. A conditional indirect branch conditions execution of an instruction whose address is stored at specified location on the value of a program variable, for example.

One may calculate an average trace data rate per executed instruction when a conventional program flow trace scheme is used in conjunction with a typical task-oriented application. For example, use of the conventional program flow trace scheme outlined above in an application for controlling engine power trains in which approximately 5% of the executed instructions are unconditional direct branches, 10% are conditional branches and 4% are indirect branches, generates a trace data rate of about 0.8-1.0 bits per executed instruction. If the number of instructions per cycle is, for example, 0.52 for this specific application, then a 200 MHz processor core will generate a conventional trace data rate of about 80-100 Mbits/s.

A conventional interactive 2-pin tool interface of a computer processing system has a typical bandwidth of 40 Mbits/s. Users may interactively access the computer processing system with external devices (i.e., tools) via the pins of the interactive tool interface. Subsequently, in order to retrieve and accommodate the conventional trace data rate as described above, an additional 2-3 dedicated trace pins are required. This is a cost, both in terms of additional dedicated trace pins and chip complexity, that system design engineers would like to avoid. Furthermore, the compressed trace data rate increases as the computing power and clock rate of modern processors increase, thereby requiring even more dedicated trace pins to retrieve/output the larger volumes of trace data.

Of the trace data generated by the conventional program flow trace scheme, about 25% comprise data associated with conditional branches and about 75% comprise data associated with indirect branches. Although the potential for reducing the amount of trace data associated with conditional branches is marginal, one embodiment of the present invention, as described further below, reduces the larger amount of trace data associated with the indirect branches.

Of the indirect branch trace data, approximately 90% is generated from function/subroutine call returns (RETs). According to an embodiment of the invention, whether or not a RET instruction (i.e., RET statement) generates trace data depends upon whether or not the program application that incorporates the RET instruction allows the operating system (OS) of the computer system which runs the application to preempt execution of one or more instructions of the application through stack manipulation, where a stack is a memory structure that provides a means of handling data and/or instructions.

Often a stack-oriented programming language provides some sort of stack manipulation operators. For example, commonly provided stack manipulation operators may include a "dup" operator that duplicates the element at the top of the stack, and "exch" operator that exchanges elements at the top of the stack (e.g., the first element becomes the second element and the second element becomes the first element), a "roll" operator that cyclically permutes elements in the stack or on part of the stack, and a "pop" operator that discards the element at the top of the stack. Additionally, as discussed further below, stacks may be manipulated by exchanging one stack for another stack.

A RET statement causes execution to leave the current function or subroutine and resume at a point in the application immediately after the point where the function or subroutine was called via a CALL statement. This resumption point is known as the subroutine's return address. Typically, the return address is saved, usually on the processor's stack as part of the operation of making the function/subroutine call.

For an application that does not allow the OS of the computer processing system 100 to preempt its instructions stored in the stack 140 via stack manipulation, i.e., there is no manipulation of the processor stack 140, generation of trace data when executing a RET instruction is not required. For example, a RET instruction, being an indirect branch instruction, points to a location in the stack 140 which contains an address of the instruction directly after the function call instruction. However, since there is no stack manipulation, the address of the instruction (directly after the function call instruction) continues to occupy the same stack location. More specifically, an indirect branch RET instruction being executed without stack manipulation is the operational equivalent of an unconditional direct branch RET instruction that requires no trace signaling (i.e., requires no program flow trace and thus no generation of trace data).

However, in order to provide effective program flow tracing when the program application allows the OS to preempt its instructions via stack manipulation, trace signaling may be necessary when executing RET instructions. According to an embodiment of the invention, if during a function/subroutine call the stack 140 is manipulated, the preempting operation system, also known as a real-time operating system (RTOS), will send to the trace unit 125 an identifier of the current task (i.e., a task ID number) associated with the stack manipulation.

Each task has its own stack. Typically, a cyclic timer interrupt enables the RTOS to perform a task switch (e.g., one stack is exchanged for another stack by changing a stack pointer). The cyclic timer interrupt (performed by an Interrupt Service Routine (ISR)) will generate an interrupt entry trace message. The ISR may then disable trace generation to avoid unnecessary tracing of the RTOS. After the RTOS has explicitly written the task identification number to the trace unit 125, it will enable trace generation before or when a new task starts to run.

According to the above-described embodiment of the invention, the RTOS assists the dedicated program flow trace scheme implemented as hardware and/or software to generate a high compression trace data rate. Since the software assistance comes from the RTOS which is typically a very reliable part of the overall software platform, any risk that the high compression scheme causes artifacts is quite limited. In addition, not only does the RTOS-assisted compression scheme generate high compression trace data rates by eliminating trace data associated with function/subroutine call RET statements when there is no stack manipulation, it also provides information in the form of trace data on executed tasks associated with stack manipulation events, thereby allowing a trace data decompression algorithm to more effectively reconstruct the full program flow.

According to embodiments of the present invention, high compression program flow tracing may increase compression of trace data over conventional schemes by a factor of 2-3. For example, application of embodiments of high compression program flow tracing of the present invention to the 200 MHz processor running the engine power train control application as discussed above may improve the trace data rate from 80-100 Mbits/s to 30-50 Mbits/s, thereby accommodating a 2-pin tool interface to receive and further process the trace data at the high compression trace data rate. Additional pins dedicated to receiving and processing the trace data would not be required.

According to another embodiment of the invention, the trace unit 125 may time stamp the program flow trace data received from the CPU 105. Time stamping the trace data allows a user of the external tool (not shown) to determine execution time of the instructions for which trace data was generated, or to measure distance between arbitrary application events.

Figure 2:
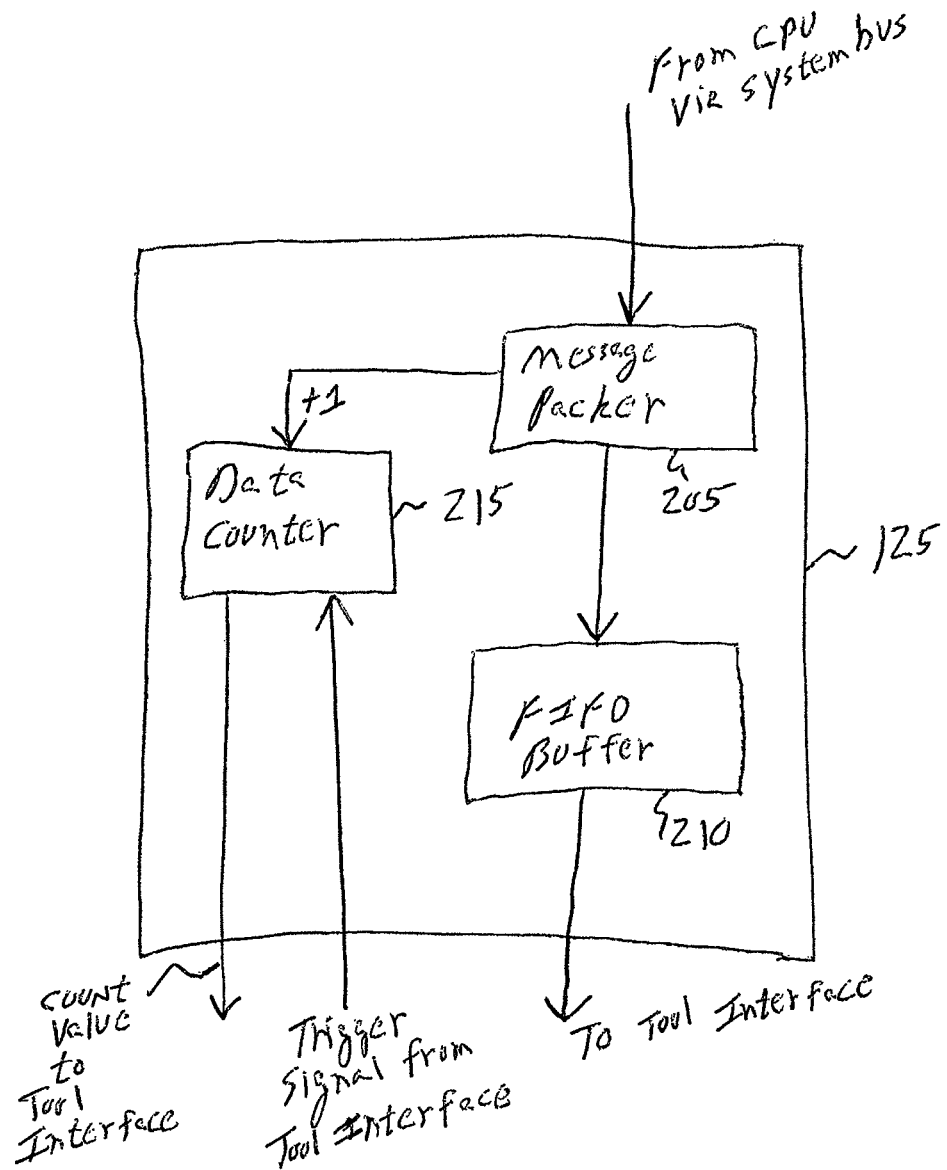
FIG. 2 is a schematic diagram of the trace unit illustrated in FIG. 1, according to an embodiment of the invention.

FIG. 2 is a schematic diagram of the trace unit 125 illustrated in FIG. 1, according to an embodiment of the invention. The trace unit includes a message packer 205, a first-in-first-out (FIFO) buffer 210, and an optional data counter 215. When the trace unit 125 includes the data counter 215, the processing system 100 is enabled to time stamp the program flow trace data. The trace unit 125 including the data counter 215 is described below, however, the scope of the invention covers generation of non-time-stamped high compression program flow trace data rates when the trace unit 125 does not include the data counter 215.

Time stamping trace messages may be summarized as follows: by using only a few data bits of a trace message currently being received by the tool interface 130 to indicate the amount of trace data currently in the FIFO buffer 210, an external tool (not shown) coupled to the tool interface 130 can generate a virtual time stamp for a trace message currently being received by the FIFO buffer 210, where the virtual time stamp indicates the time at which the trace message currently being received by the FIFO 210 buffer was generated, at therefore the time at which the instruction associated with the trace message was executed by the CPU 105.

In operation, the message packer 205 receives one or more trace messages and packs the messages together to form one entry in the FIFO buffer 210. For example, an entry may be 32 bits. Once the packer 205 has assembled a 32-bit long packed message, the 32-bit long packed message is sent to the FIFO buffer 210 to occupy one entry in the buffer, where the FIFO buffer 210 may have a plurality of entries. However, a 32-bit long packed message will most likely not comprise a whole number of messages. Thus, after the 32-bit long packed message is formed and sent to the FIFO buffer 210, the remainder of the last message added to the 32-bit long packed message is used to start a new 32-bit long packed message. According to an embodiment of the invention, when a next message is added to the reminder of the last message in building the new 32-bit long packed message, the message packer 205 outputs a pulse that increments a count value of the data counter 215 by one.

Then, whenever the FIFO buffer 210 outputs an entry to the tool interface 130, the tool interface 130 (or alternatively a clock (not shown) of the trace unit 125 or a system clock (not shown)) sends a trigger signal to the data counter 215, which then triggers the data counter 215 to send the count value to the tool interface 130 and reset the count value. For example, if the count value is represented by four bits, the tool interface 130 uses four bits of a 32-bit high compression trace data (also referred to as a 32-bit high compression trace message) to represent the counter value. An external tool may then use the 4-bit counter value from the high compression trace data to assign a virtual time stamp to a trace message that is currently being stored in the FIFO buffer 210.

As mentioned above, in one embodiment the trace unit 125 illustrated in FIG. 2 does not include the data counter 215. In this embodiment, the trace unit 125 comprises the message packer 205 adapted to receive trace messages from the CPU 105, pack a plurality of received messages to generate packed messages each of a predefined bit length, and send each of the packed messages to be stored sequentially into entries of the FIFO buffer 210. The FIFO buffer 210 then sends each of the stored packed messages to the tool interface 130 in a first-in-first-out manner for further processing and analysis by an external tool (not shown) coupled to the tool interface 130. For example, the external tool may apply decompression algorithms to the high compression program flow trace data such that a user may either debug or analyze the performance of the program application being executed by the computer processing system 100.

Figure 3:
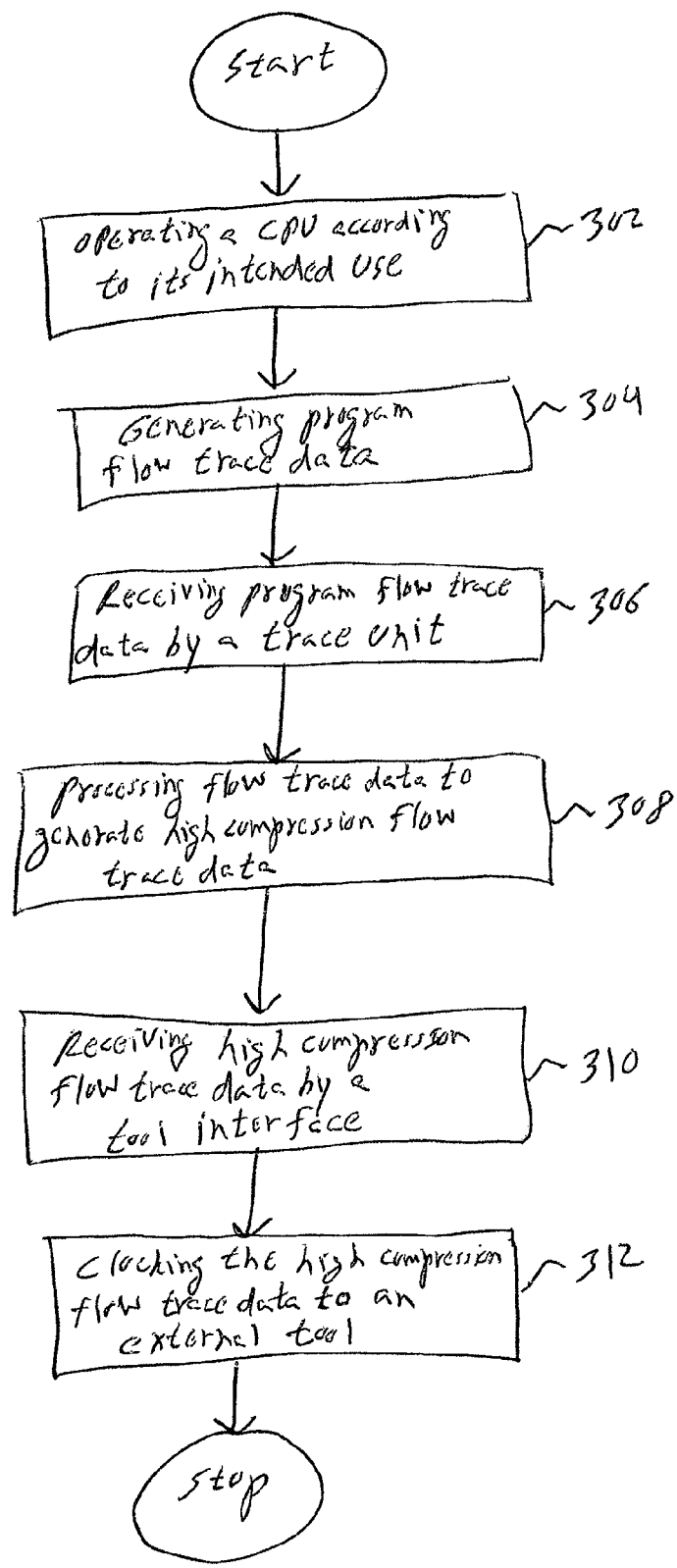
FIG. 3 is a flowchart of exemplary method steps for generating high compression program flow trace data, according to an embodiment of the invention.

FIG. 3 is a flowchart of exemplary method steps for generating high compression program flow trace data, according to an embodiment of the invention. At step 302, the CPU 105 of the computer processing system 100 is operated according to its intended use. For example, the CPU 105 utilizes the register 145 and/or the stack 140 to store a memory address of a program instruction that is currently being executed by the CPU 105. The program instructions may be part of an application, embedded or non-embedded, that is stored in the memory 120 and is currently being executed by the CPU 105.

At step 304, the CPU 105 generates program flow trace data (also referred to as trace messages) when executing conditional branch instructions and a subset of indirect branch instructions of the application stored in the memory 120. In an embodiment of the invention, the subset of the indirect branch instructions includes all indirect branch instructions, excluding however those RET indirect branch instructions of a function or a subroutine called by the program application in which the stack 140 is not manipulated after the function or subroutine is called by the program application. For those RET indirect branch instructions for which the stack 140 is manipulated by the CPU 105 after the function or subroutine is called by the program application, the CPU 105 generates trace messages comprising information corresponding to the executed tasks associated with the stack manipulation.

At step 306, the program flow trace data generated by the CPU 105 when executing the application is received by the trace unit 125 over the system bus 110 or a dedicated trace data bus (not shown in FIG. 1).

At step 308, the trace unit 125 processes the received program flow trace data to generate high compression program flow trace data, also referred to as high compression trace messages. In one embodiment, the trace unit 125 packs the program flow trace data into packed messages of predefined bit lengths and stores the packed messages in entries of a FIFO buffer 210.

At step 310, the packed messages (i.e., the high compression program flow trace data) is received by the tool interface 130. The tool interface 130, driven, for example, by a tool interface clock or a system clock of the computer processing system 100, for example continuously clocks out the high compression program flow trace data to an external tool adapted to be coupled to the tool interface pins 150 of the tool interface 130 at step 312. In one embodiment, the tool interface 130 reverts to a conventional interactive tool interface when the tool interface clock no longer clocks the tool interface 130, thereby allowing a user of the external tool to access and control the computer processing system 100 in a conventional manner.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for generating high compression program flow trace data, comprising:
    generating first program flow trace data whenever a conditional branch instruction of a program is executed by a central processing unit (CPU);
    generating second program flow trace data whenever an indirect branch instruction of a subset of indirect branch instructions is executed by the CPU, the subset of indirect branch instructions excluding a RETURN (RET) indirect branch instruction of a function or a subroutine of the program for which a stack for storing instruction addresses of the program is not manipulated after a CALL instruction to the function or subroutine is executed by the CPU and before the RET instruction is executed by the CPU; and
    generating third program flow trace data whenever the stack for storing instruction addresses of the program is manipulated, the manipulation occurring after the CALL instruction to the function or subroutine is executed by the CPU and before the RET instruction is executed by the CPU.

2. The method of claim 1, further comprising processing the first, second and third program flow trace data to generate high compression program flow trace data.

3. The method of claim 2, wherein processing comprises:
    packing first, second and third program flow trace data together to generate packed program flow trace data, each packed program flow trace data having a predefined bit length; and
    storing the packed program flow trace data in a first-in-first-out buffer.

4. The method of claim 2, further comprising sending the high compression program flow trace data to a tool interface, the tool interface including one or more pins adapted to couple with an external tool for receiving the high compression program flow trace data.

5. The method of claim 4, wherein the high compression program flow trace data is continuously clocked to the one or more pins.

6. The method of claim 4, wherein the tool interface comprises two pins adapted to couple with the external tool for receiving the high compression program flow trace data, at data rates up to 50-200 Mbits/s.

7. The method of claim 1, wherein the first and second program flow trace data comprise at least one of an address stored in an instruction pointer register, the address corresponding to an instruction of the program currently being executed by the CPU, and data which is being processed as a result of the instruction of the program currently being executed by the CPU, and wherein the instruction currently being executed is one of the conditional branch instruction and the indirect branch instruction of the subset of indirect branch instructions.

8. The method of claim 7, wherein the data which is being processed as a result of the instruction of the program currently being executed by the CPU comprises data being processed by the CPU and data being transmitted on data busses.

9. The method of claim 1, wherein manipulating a stack comprises preempting execution of the instructions of the program using the stack by an operating system.

10. The method of claim 9, wherein the third program flow trace data comprise an identifier of a current task associated with the stack manipulation by the operating system.

11. The method of claim 1, wherein manipulating a stack comprises exchanging the stack for a second stack.

12. A system configured to generate high compression program flow trace data, comprising:
   a central processing unit (CPU) comprising a stack adapted to store instruction addresses of a program, the CPU adapted to:
      generate first program flow trace data whenever a conditional branch instruction of the program is executed by the CPU,
      generate second program flow trace data whenever an indirect branch instruction of a subset of indirect branch instructions is executed by the CPU, the subset of indirect branch instructions excluding a RETURN (RET) indirect branch instruction of a function or a subroutine of the program for which the stack is not manipulated after a CALL instruction to the function or subroutine is executed by the CPU and before the RET instruction is executed by the CPU, and
      generate a third program flow trace data whenever the stack is manipulated, the manipulation occurring after the CALL instruction to the function or subroutine is executed by the CPU and before the RET instruction is executed by the CPU;
   a system bus coupled to the CPU; and
   a trace unit coupled to the system bus, the trace unit adapted to process the first, second and third program flow trace data to generate high compression program flow trace data.

13. The system of claim 12, wherein the trace unit comprises:
   a message packer adapted to pack the first, second and third program flow trace data together to generate packed program flow trace data, each packed program flow trace data having a predefined bit length; and
   a first-in-first-out buffer adapted to store the packed program flow trace data.

14. The system of claim 12, further comprising a tool interface coupled to the system bus, the tool interface including one or more pins adapted to couple with an external tool for receiving the high compression program flow trace data.

15. The system of claim 14, further comprising a clock adapted to clock the high compression program flow trace data to the one or more pins.

16. The system of claim 14, wherein the tool interface comprises two pins adapted to couple with the external tool for receiving the high compression program flow trace data, at data rates up to 50-200 Mbits/s.

17. The system of claim 12, further comprising an instruction pointer register, and wherein the first and second program flow trace data comprise at least one of an address stored in the instruction pointer register, the address corresponding to an instruction of the program currently being executed by the CPU, and data which is being processed as a result of the instruction of the program currently being executed by the CPU, and wherein the instruction currently being executed is one of the conditional branch instruction and the indirect branch instruction of the subset of indirect branch instructions.

18. The system of claim 17, wherein the data which is being processed as a result of the instruction of the program currently being executed by the CPU comprise data being processed by the CPU and data being transmitted on the system bus.

19. The system of claim 12, further comprising a memory adapted to store an operating system and coupled to the system bus, and wherein manipulating a stack comprises preempting execution of the instructions of the program using the stack by the operating system.

20. The system of claim 19, wherein the third program flow trace data comprise an identifier of a current task associated with the stack manipulation by the operating system.

21. The system of claim 19, wherein manipulating a stack comprises exchanging the stack for a second stack.

22. A system for generating high compression program flow trace data, comprising:
   means for generating first program flow trace data whenever a conditional branch instruction of a program is executed by a central processing unit (CPU);
   means for generating second program flow trace data whenever an indirect branch instruction of a subset of indirect branch instructions is executed by the CPU, the subset of indirect branch instructions excluding a RETURN (RET) indirect branch instruction of a function or a subroutine of the program for which a stack for storing instruction addresses of the program is not manipulated after a CALL instruction to the function or subroutine is executed by the CPU and before the RET instruction is executed by the CPU; and
   means for generating third program flow trace data whenever the stack for storing instruction addresses of the program is manipulated, the manipulation occurring after the CALL instruction to the function or subroutine is executed by the CPU and before the RET instruction is executed by the CPU.

* * * * *